US012397420B2

(12) United States Patent
Tulsidas et al.

(10) Patent No.: US 12,397,420 B2
(45) Date of Patent: Aug. 26, 2025

(54) ARTIFICIAL INTELLIGENCE (AI) HAND TYPE DEVICE FOR PERFORMING TASKS WITH ACUTE PRECISION

(71) Applicant: Techolution Consulting LLC, New York, NY (US)

(72) Inventors: Luv Tulsidas, New York, NY (US); Krish Tulsidas, New York, NY (US); Vivek V, New York, NY (US)

(73) Assignee: Techolution Consulting LLC, New York, NY (US)

( * ) Notice: Subject to any disclaimer, the term of this patent is extended or adjusted under 35 U.S.C. 154(b) by 165 days.

(21) Appl. No.: 18/513,018

(22) Filed: Nov. 17, 2023

(65) Prior Publication Data
US 2025/0162143 A1 May 22, 2025

(51) Int. Cl.
*B25J 9/16* (2006.01)
*G05B 13/02* (2006.01)

(52) U.S. Cl.
CPC .............. *B25J 9/163* (2013.01); *B25J 9/1697* (2013.01); *G05B 13/0265* (2013.01)

(58) Field of Classification Search
CPC ........ B25J 9/163; B25J 9/1697; B25J 9/1612; G05B 13/0265
USPC ................. 700/245–264; 318/568.11–568.25
See application file for complete search history.

(56) References Cited

U.S. PATENT DOCUMENTS

| 10,953,553 | B2 * | 3/2021 | Nakagawa | B25J 15/10 |
| 11,389,248 | B1 * | 7/2022 | Roh | G05B 13/0265 |
| 11,559,884 | B2 * | 1/2023 | Hallock | B25J 15/08 |
| 11,590,658 | B2 * | 2/2023 | Takahashi | B25J 13/084 |
| 12,026,665 | B2 * | 7/2024 | Fisher | G06F 18/24143 |
| 12,090,637 | B2 * | 9/2024 | Wong | B25J 15/0206 |
| 12,269,158 | B2 * | 4/2025 | Chen | B25J 19/0075 |
| 12,280,495 | B2 * | 4/2025 | Muthusamy | B25J 13/082 |
| 2009/0012920 | A1 * | 1/2009 | Kwok | G06N 3/004 706/50 |
| 2014/0028040 | A1 * | 1/2014 | Oda | B25J 19/021 294/115 |

(Continued)

*Primary Examiner* — Jaime Figueroa
(74) *Attorney, Agent, or Firm* — Mestechkin Law Group P.C.

(57) ABSTRACT

The present application relates to an Artificial Intelligence (AI) hand type device that emulates human hand capabilities, delicately to autonomously identify and pick up small and fragile objects, including but not limited to nails, screws, and microchips, with precision. Equipped with advanced sensors, algorithms, and AI, the device accurately locates object positions and angles using computer vision technology and a high-resolution camera. It performs quality inspection analysis, object placement, movement and mechanical operations autonomously, based on AI decisions according to the real time perspective of its surrounding environment. The device's AI-driven robotic arms adapt their grip strength, pressure and temperature for handling tiny delicate items such as eye-glass screws and larger objects such as motorized drill machines. With the ability to learn from domain experts, the present device autonomously executes tasks based on past experiences. Notably, the device allows human interaction through voice commands, user interface, or physical assistance to teach it object identification, precise location detection, quality control readings and mechanical operations to perform a certain skilled task.

19 Claims, 2 Drawing Sheets

(56) References Cited

U.S. PATENT DOCUMENTS

| | | | |
|---|---|---|---|
| 2017/0282363 A1* | 10/2017 | Yamada | B25J 9/1612 |
| 2019/0202070 A1* | 7/2019 | Nakagawa | B25J 9/1612 |
| 2019/0291277 A1* | 9/2019 | Oleynik | B25J 9/1669 |
| 2020/0164506 A1* | 5/2020 | Hallock | B25J 9/1612 |
| 2021/0023714 A1* | 1/2021 | Zhang | H04N 13/254 |
| 2021/0023715 A1* | 1/2021 | Zhang | B25J 9/1692 |
| 2022/0063111 A1* | 3/2022 | Wong | B25J 9/1612 |
| 2022/0125530 A1* | 4/2022 | Toporek | A61B 90/37 |
| 2022/0168899 A1* | 6/2022 | Boroushaki | B25J 9/1664 |
| 2022/0258342 A1* | 8/2022 | Gildert | B25J 9/1661 |
| 2022/0318459 A1* | 10/2022 | Narang | G06N 3/088 |
| 2023/0072207 A1* | 3/2023 | Muthusamy | G01L 5/166 |
| 2023/0073681 A1* | 3/2023 | Ayyad | B25J 9/1612 |

* cited by examiner

ARTIFICIAL INTELLIGENCE (AI) HAND TYPE DEVICE FOR PERFORMING TASKS WITH ACUTE PRECISION

TECHNICAL FIELD OF THE INVENTION

The present application relates to the field of robotics, artificial intelligence (AI), and computer vision technology. Specifically, it pertains to an AI hand-type device designed to perform various tasks independently and with precision. The device is capable of delicate object handling and quality control inspection, revolutionizing automation, and robotics across multiple industries, including but not limited to quality control, manufacturing, logistics, food industry, electronics, medical/surgical, pharmaceuticals, agriculture, and waste management.

BACKGROUND OF THE INVENTION

In today's rapidly evolving technological landscape, robotics, artificial intelligence (AI), and computer vision have emerged as key fields that drive innovation across industries. Robotics, in particular, has revolutionized automation by introducing machines capable of performing tasks with high precision, efficiency, and autonomy.

Traditional industrial robots have been successful in handling heavy objects in manufacturing and assembly processes. However, as industries evolve and diversify, there is a growing need for robots that can delicately handle small and fragile objects with the same level of precision as the human hand.

Existing robot grippers used in industrial settings are often designed to lift and manipulate heavy objects, featuring robust mechanical components and powerful actuators. While these grippers excel at heavy-duty tasks, they are not well-suited for handling smaller items that require delicate and precise manipulation, such as nails, screws, microchips, and diamonds. These objects are commonly encountered in industries like electronics manufacturing, medical device assembly, and jewelry production.

To address this limitation, various AI-driven robotic systems have been developed, including collaborative robots (cobots), surgical robots, pick-and-place robots, and soft grippers. These systems integrate AI and computer vision to achieve more versatile and gentle gripping capabilities. However, most of these solutions still lack the ability to perform delicate handling and quality control inspection with the precision and dexterity of the human hand.

The AI hand-type devices, while significant advancements in robotics and automation, exhibit several drawbacks that limit their full potential. One prominent limitation is their limited dexterity, as they lack the intricacy and sensitivity of a human hand, posing challenges in handling delicate or irregularly shaped items. Moreover, the complexity involved in setting up and programming these devices hinders their widespread adoption, demanding specialized skills and resources. Safety concerns arise as humans interact with AI-driven robotic grippers, necessitating meticulous risk management to prevent accidents resulting from system malfunctions or recognition failures.

Additionally, some devices struggle to adapt to new objects due to their reliance on pre-defined models, hindering their versatility and adaptability in dynamic environments. Fragility of delicate items is another pressing concern, as even with efforts to handle items gently, these devices may inadvertently cause damage or breakage, leading to potential losses in various industries. Furthermore, size and weight limitations of certain AI hand-type devices restrict their applicability, limiting their usage in scenarios requiring the handling of larger or heavier objects.

To overcome the limitations of existing AI hand-type devices and unlock their true potential, an innovative solution is required.

The embodiments of an AI hand-type device discussed herein, emerge as a groundbreaking answer to address the shortcomings of current technology. This revolutionary device integrates cutting-edge robotics, artificial intelligence, and computer vision technology to offer a myriad of benefits.

The device boasts advanced capabilities such as delicate object handling, real-time decision-making, and adaptability to new objects and scenarios. Its key differentiator lies in its ability to emulate the dexterity of the human hand, enabling it to perform intricate tasks with precision and accuracy.

SUMMARY OF THE INVENTION

The present application is directed to an AI hand-type device that has the capability to perform various tasks independently and with precision, tailored to address specific requirements. It can perform tasks like identifying, repositioning, picking, detecting location and placing the delicate objects with precision and accuracy, making real time decisions autonomously according to real time perspective of its surrounding environment and quality inspection analysis of the identified objects.

In an embodiment of the present invention, the device includes of plurality of fingers connected to at least one arm that perform the function of gripping tiny and/or delicate items, such as eyeglass screws as well as larger objects; a camera seamlessly integrated into the device, serving the function of capturing high-quality images of the delicate objects (64 megapixels or more), processing the images by a processing unit and inferring critical information from images to leverage AI driven real time decisions; plurality of sensors for detecting pressure, temperature, force, a user interface; a real time decision-making ability mechanism, wherein the mechanism enables the device to handle objects in a specific orientation further allowing it to learn from past experiences, improve its handling precision and optimal path generation and perform progressive quality inspection analysis.

In another embodiment of the present invention, the device can hold the delicate object in front of a camera at a precise location and angle and determine the quality inspection for an object at high degree of precision The camera based on reference can advise on the direction of the object further teaching the AI hand to adjust and align effectively to attain a high quality reading of the delicate object.

In yet another embodiment of the present invention, the device autonomously makes decisions (decision based ability) using the information it captures, ensuring the delicate and precise handling of targeted objects.

It should be noted that while the present invention has been described with reference to fasteners, it is not limited to this particular type of manufactured object and can be adapted to inspect other types of objects as well. Additionally, various modifications and alterations to the system and method may be possible without departing from the scope of the invention.

BRIEF DESCRIPTION OF THE DRAWINGS

The foregoing summary, as well as the following detailed description of various embodiments, is better understood when read in conjunction with the drawings provided herein. For the purposes of illustration, the drawings disclose subject matter which is not limited to the specific methods and instrumentalities disclosed. Further, the advantages and features of the present disclosure will better understood with reference to the following detailed description and claims taken in conjunction with the accompanying drawing, wherein like elements are identified with like symbols, and in which:

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a," "an," and "the" designate both the singular and the plural, unless expressly stated to designate the singular only.

Further, the use of terms "first", "second", and "third", and the like, herein do not denote any order, quantity, or importance, but rather are used to distinguish one element from another.

The AI hand-type device presented in this application is a complex integration of various components designed to perform tasks independently, respond to dynamic environments, and execute high-precision quality inspection.

This invention represents a significant advancement in the field of robotics by enhancing the dexterity and flexibility of robotic hands, allowing them to handle smaller and delicate objects in a mobile environment. This level of precision is typically lacking in most current robotic hands. Moreover, the addition of sensory capabilities such as eyes and ears enables the robotic hand to adapt and adjust its precision on the fly, resembling a human hand's capabilities.

However, the most groundbreaking aspect of this invention is its capacity to be trained by a human expert through physical and vocal instructions when in learning mode. Unlike traditional robotics that require pre-programming, this innovation enables individuals with domain expertise, even those without coding or technical skills, to easily teach the AI Hand to perform specific tasks. This teaching process is akin to instructing a human apprentice, making the technology highly accessible and versatile.

The AI hand-type device has the capability to perform various tasks independently and with precision. It performs quality inspection analysis, object placement, and movement autonomously, making real-time decisions according to the real time perspective of its surrounding environment.

Figure 1:
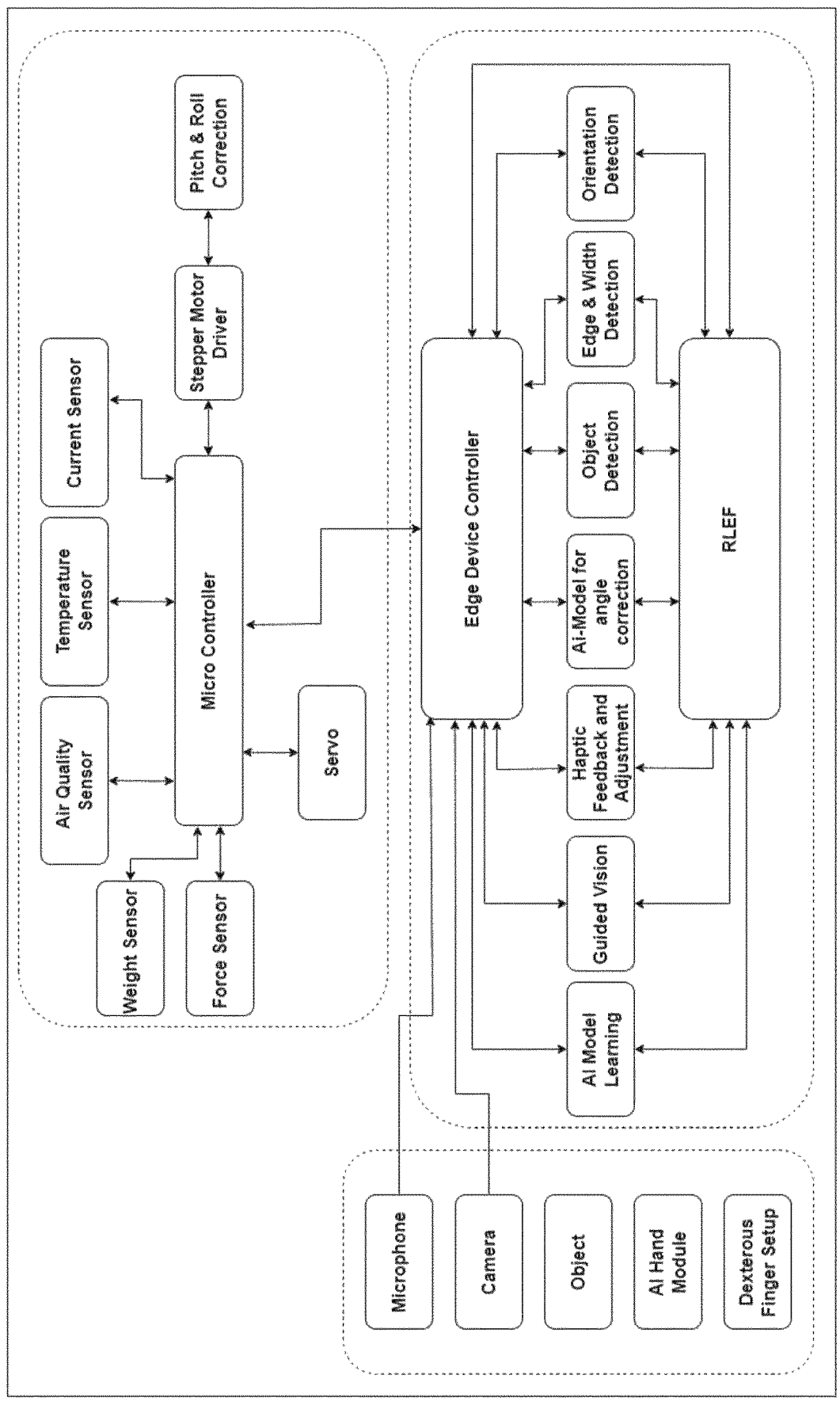
FIG. 1 illustrates an architectural flow diagram of the AI hand-type device according to an embodiment of the present invention.

FIG. 1 illustrates an architectural flow diagram of the device divided into three sections namely input, output and processing unit. All the three sections are interrelated to each other.

Input Section:

Microphone: This component captures audio input and performs functions like object identification, precise location detection, and quality control readings. It communicates with the Edge Device Controller to facilitate these tasks.

Camera: The camera captures high-quality images of delicate objects. These images are processed by a microcontroller or processing unit. The camera's function is not limited to capturing images, it is also involved in inferring critical information from the images. This includes detecting the object, determining its edge and width, and assessing its angle and orientation. It also leverages an AI model for angle correction.

Object: This represents the physical objects that the device interacts with. The microphone and camera provide input data related to these objects.

AI Hand Module: This module may be responsible for controlling the device's movements and interactions with objects based on the input from the microphone and camera. It likely involves AI algorithms for precise control.

Dexterous Finger Setup: This is likely a physical component or mechanism that allows the device to manipulate objects with fine motor skills.

Output Section:

This section likely receives information from the processing unit and AI-driven decision-making system to perform various actions based on the data and decisions made in Section 3.

Processing Unit Section:

Sensors: This section comprises several sensors, including weight sensors, air-quality sensors, force sensors, and temperature sensors. These sensors are responsible for gathering data about the environment and objects the device interacts with. They detect attributes such as pressure, temperature, force, air quality, and the weight of objects Data Processing: The data collected by the sensors is processed by the processing unit or microcontroller, which can make sense of the information provided by the sensors.

AI-Driven Decision-Making System: The processed data is then used by an AI-driven decision-making system. This system likely uses machine learning and AI algorithms to make informed decisions based on the sensor data. These decisions may include optimizing task execution, adapting to dynamic environments and conditions, and potentially controlling the output section of the device.

Figure 2:
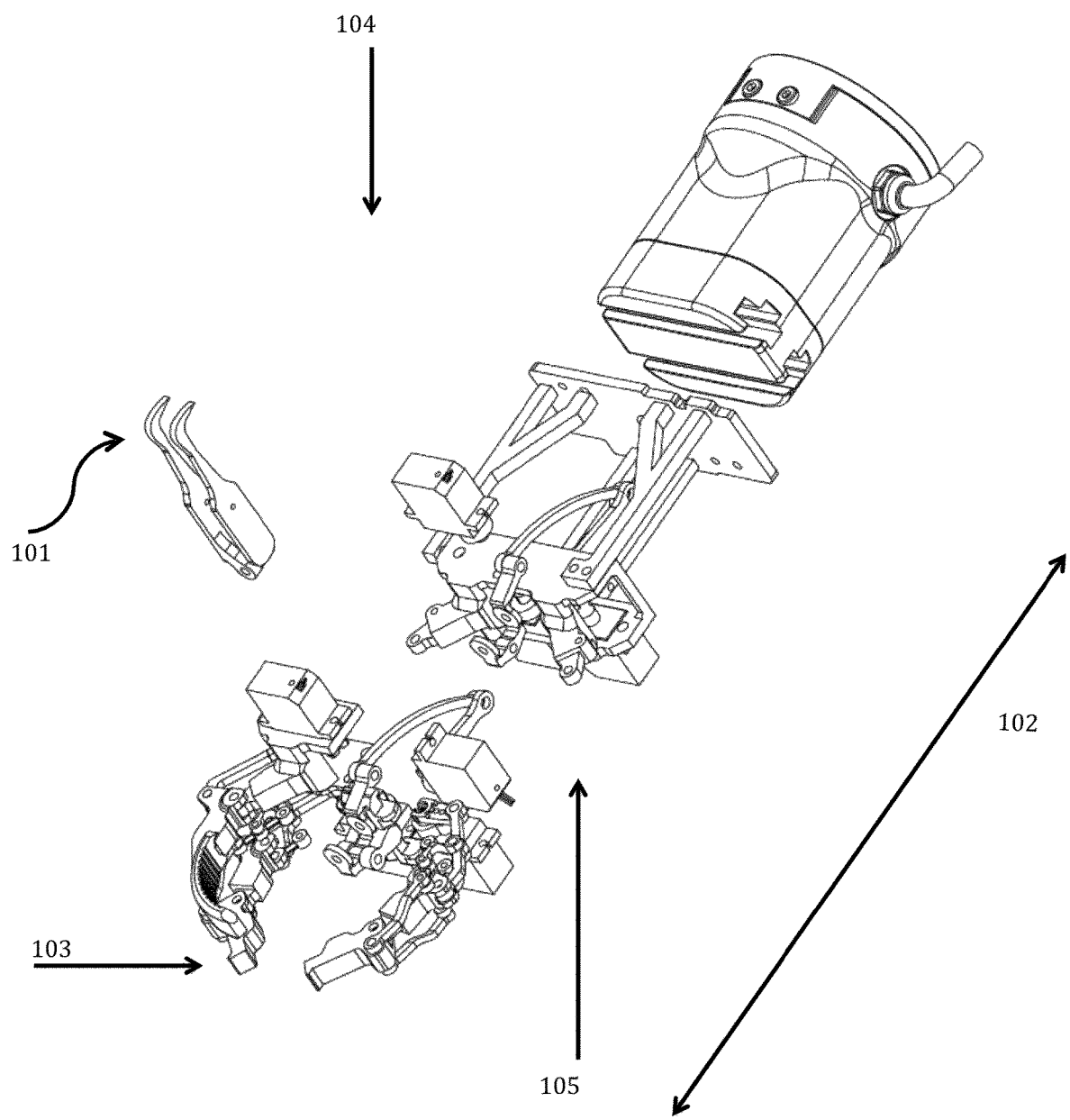
FIG. 2 illustrates an exploded view of the AI hand-type device according to an embodiment of the present invention.

The device 101 as illustrated in FIG. 2 comprises of at plurality of fingers 103 connected to at least one arm 102, arm (part of a robotic moving body) 102 associated with a hand, capable of delicately gripping and manipulating small and fragile objects including but not limited to nails, screws, and microchips, with precision; a camera 104 seamlessly integrated into the device 101, serving the function of capturing high-quality images of the delicate objects, processing the images by a processing unit and inferring critical information from images to leverage AI driven real time decisions; plurality of sensors 105 for detecting pressure, temperature, force, air quality of the surrounding environment, weight of the object(s) and similar attributes, a user interface and an autonomous real time decision-making ability mechanism.

The fingers 103 of the device 101 are biomimetic, capable of performing motions emulating those of the human hand. The fingers 103 are also capable of adjusting their shape and position to accommodate objects of different sizes and shapes. The arm 102 can be moved in a manner similar to a human hand and can potentially be part of a larger robotic body. The device's 101 design allows for the possibility of pairing multiple arms to the same body, offering versatility in performing various tasks.

In fact, the arm 102 of the device 101 is configured to function as a separate device and is adaptable for various environments by attaching multiple sorts of accessories, such as a forklift attachment, to suit its operational needs. The AI hand-type device 101 has the capability to dynamically adapt its grip strength, pressure values, positioning in response to inputs for handling both delicate items and larger objects and accommodate their specific requirements.

Furthermore, the device 101 can hold the delicate object in front of a camera 104 at a precise location and angle and determine the quality inspection for an object at a high degree of precision. The camera 104 further consists of a reference-based camera module, through which the device receives precise three-dimensional coordinates of the object, enabling the device 101 to calculate an optimal path and navigate towards the object, aligning itself effectively to attain a meticulous reading of the delicate object.

One of the defining attributes of the invention is its autonomous decision-making ability mechanism. Empowered by sophisticated artificial intelligence algorithms, the device operates independently, responding adeptly to changes in its environment. It performs intricate quality inspection analyses of identified objects, continuously learning and refining its techniques through accumulated experiences. This iterative learning process contributes to the enhancement of precision and adaptability over time.

The comprehensive network of advanced sensors 105 gather real-time data concerning the surrounding environment. These sensors 105 monitor variables such as temperature, humidity, light, and object proximity. The data collected facilitates informed decisions by the AI-driven decision-making system, enabling optimized task execution within dynamic environments and conditions.

The device's AI-driven robotic arms 102 adapt their grip strength, pressure and temperature for handling tiny delicate items like eye-glass screws and larger objects such as motorized drill machines. With the ability to learn from domain experts, the present device autonomously executes tasks based on past experiences.

Notably, the device 101 allows human interaction through voice commands, user interface, or physical assistance to teach it object identification, precise location detection, and quality control readings.

Through the device 101 pre-trained model(s) can be downloaded and further fine tuned for the specific task/environment via several mechanisms including but not limited voice commands, physical assistance.

The device's user interface serves as a conduit for seamless interaction between human operators and its AI-driven capabilities. The interface facilitates human interaction through voice commands, user interface, or physical assistance to teach it object identification, precise location detection, quality control readings and mechanical operations to perform a certain skilled task. Users can employ diverse interaction modes, including voice commands, intuitive interface inputs, and physical guidance, to provide specific training to the device.

Moreover, the device 101 is equipped with the ability to gather and process real time data from haptic feedback involving physical factors such as temperature, force to pick up the object, and touch and deliver real time data to the AI-driven decision-making system. This real-time feedback enhances the overall decision-making process, leading to heightened accuracy.

Furthermore, the device is equipped with the ability to gather and process real time data from the non-haptic elements including but not limited to temperature, sound and air quality and deliver real time data to the AI-driven decision-making system.

The device's adaptability transcends industry boundaries, making it indispensable across various sectors. From manufacturing and logistics to electronics assembly, medical procedures, pharmaceuticals, agriculture, and waste management, the device's capabilities are applicable to a wide array of tasks. Whether handling microchips or motorized machinery, the device's finesse remains consistent and exceptional.

Notably, the device allows human interaction through voice commands, user interface, or physical assistance to teach it object identification, precise location detection, and quality control readings.

The AI hand-type device is designed to undergo training and learning without coding/technical skills under the guidance of human experts, employing a versatile approach encompassing three distinct modes: shadow mode, physical guidance mode, and remote control mode. In all 3 modes, the AI hand device uses all its edge intelligence peripherals.

In the shadow mode, the device harnesses its vision AI system to watch, analyze and learn external human motions and inputs. It can discern and replicate these actions with precision, employing its internal mechanisms. Furthermore, the device processes audio inputs through its voice AI system, allowing it to not only replicate human actions but also execute specific tasks based on the information gathered. This mode leverages the integration of vision and voice AI to enable the device to autonomously mimic and carry out a wide range of tasks.

In the physical guidance mode, human experts provide teaching and learning medium (guidance) through physical interactions. They physically manipulate the device and interact with a specialized console coupled to the AI-hand device that controls the mechanical aspects of the hand. This hands-on approach allows experts to offer real-time feedback and refine the device's ability to perform tasks based on direct guidance, thus expanding its range of capabilities.

The remote control/pilot/operation mode introduces an external interactive console, separate from the device itself. This console serves as a central hub for human experts to guide and instruct the device in performing predefined actions. The console facilitates precise communication with the device, enabling experts to remotely control its movements and operations. This mode offers flexibility and remote accessibility in training and instructing the AI hand, making it a versatile tool for various applications.

These modes enable the device to analyze and replicate human actions, receive hands-on guidance, and be remotely controlled, making it a highly adaptable and versatile tool for executing a wide array of tasks with the precision and real time intelligence powered by AI.

The cloud server serves as a hub of data storage, analysis, and decision-making based on past experiences and domain expert knowledge and encompassing physical/non-physical attributes derived from the surrounding environment.

There is a system for autonomous delicate object handling and quality inspection analysis, comprising: AI hand-type device and a communication module enabling data exchange between the device and external systems or interfaces; and a cloud-based server for data storage, analysis, and decision-making, utilizing past experiences and domain expert learning to enhance the device's autonomy.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

The invention claimed is:

1. An artificial intelligence (AI) hand-type device for delicate object handling, comprising:
   plurality of fingers connected to at least one arm, the plurality of fingers configured for gripping and manipulating objects selected from the group consisting of nails, screws, and microchips;
   a camera integrated into the device, serving the function of capturing high-quality images of the objects, processing the images by a processing unit and inferring information related to object features including at least one of boundary, surface, dimensions and color from images to leverage AI driven real time decisions;
   wherein the camera further comprises a reference-based camera module, through which the device receives three-dimensional coordinates of the object, enabling the device to calculate a time efficient and safe flow path (collision avoidance) that navigates towards the object, aligning itself effectively to perform task(s) and analyzing an accurate reading of an object;
   a plurality of sensors for detecting pressure, temperature, force, air quality of the surrounding environment, and weight of the object(s);
a user interface; and
   an autonomous real time decision-making ability mechanism, wherein the mechanism enables the device to handle objects in a specific orientation further allowing it to learn from past experiences, improve its handling precision and optimal path generation and perform progressive quality inspection analysis.

2. The AI hand-type device of claim 1, wherein the device is configured for positioning a delicate object in front of the camera at a precise location and angle to perform high-precision identification and quality inspection analysis.

3. The AI hand-type device of claim 1, wherein the arm can be moved in a manner similar to a human hand and can potentially be part of a larger robotic body.

4. The AI hand-type device of claim 1, wherein the device's design allows for the possibility of pairing multiple arms to the same body, offering versatility in performing various tasks.

5. The AI hand-type device of claim 1, wherein the mechanics of the device are biomimetic, highly dexterous and highly flexible capable of performing intricating tasks emulating those performed by the human hand.

6. The AI hand-type device of claim 1, wherein the arm of the device is configured to function as a separate device and is adaptable for various environments by attaching multiple sorts of accessories, such as a forklift attachment, to suit its operational needs.

7. The AI hand-type device of claim 1, wherein the user interface facilitates human interaction through voice commands, user interface, or physical assistance to teach it object identification, precise location detection, quality control readings and mechanical operations to perform a certain skilled task.

8. The AI hand-type device of claim 1, wherein the device is equipped with the ability to gather and process real time data from haptic feedback involving physical factors such as temperature, force to pick up the object, and touch and deliver real time data to the AI-driven decision-making system.

9. The AI hand-type device of claim 1, wherein the device is equipped with the ability to gather and process real time data from the non-haptic elements including but not limited to temperature, sound and air quality and deliver real time data to the AI-driven decision-making system.

10. The AI hand-type device of claim 1, wherein the cloud server serves as a hub of data storage, analysis, and decision-making based on past experiences and domain expert knowledge and encompassing physical/non-physical attributes derived from the surrounding environment.

11. The AI hand-type device of claim 1, wherein the device is adaptable for multiple industries including but not limited to quality control, manufacturing, logistics, food, electronics, medical/surgical, pharmaceuticals, agriculture, and waste management.

12. The AI hand-type device of claim 1, wherein the device features fingers capable of adopting itself to accommodate objects of different sizes, shapes and surface types.

13. The AI hand-type device of claim 1, wherein the device has the capability to dynamically adapt its grip strength, pressure values, positioning in response to inputs for handling both delicate items and larger objects and accommodate their specific requirements.

14. The AI hand-type device of claim 1, wherein the device is attuned to auditory feedback, allowing it to respond to environmental cues and auditory signals emitted via sensors.

15. The AI hand-type device of claim 1, wherein using the device pre-trained model(s) can be downloaded and further fine tuned for the specific task/environment via several mechanisms including but not limited voice commands, physical assistance.

16. The AI hand-type device of claim 1, wherein the device is trained by a human expert through physical and vocal instructions using three modes namely shadow mode, physical guidance mode and remote control mode and in all the three modes, the AI hand device uses all its edge intelligence peripherals.

17. The AI hand-type device of claim 16, wherein the shadow mode analyzes human motions and inputs through vision AI, replicates them through its own mechanisms, and accordingly processes audio inputs through voice AI to execute specific tasks effectively.

18. The AI hand-type device of claim 16, wherein the physical guidance mode allows expert feedback learning of motions through a human physically guiding the hand, and toggling inputs and interacting with a console coupled to the AI-hand device that controls the hand's mechanisms instead of vision AI.

19. The AI hand-type device of claim 16, wherein the remote control/pilot/operation mode allows teaching through an external interactive console distinct from the device, to guide and instruct the device in performing predefined actions.

\* \* \* \* \*